(12) United States Patent
Matsumura et al.

(10) Patent No.: US 8,377,497 B2
(45) Date of Patent: Feb. 19, 2013

(54) SEASONING PRODUCTS WITH HIGH CONTENT OF SWEET AMINO ACIDS AND YEAST STRAIN FOR USE IN OBTAINING THE SAME

(75) Inventors: Nobuyasu Matsumura, Ibaraki (JP); Hisatoshi Shimokawa, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 592 days.

(21) Appl. No.: 12/519,915

(22) PCT Filed: Dec. 27, 2006

(86) PCT No.: PCT/JP2006/326119
§ 371 (c)(1),
(2), (4) Date: Jun. 18, 2009

(87) PCT Pub. No.: WO2008/081519
PCT Pub. Date: Jul. 10, 2008

(65) Prior Publication Data
US 2010/0028494 A1    Feb. 4, 2010

(51) Int. Cl.
*A23J 1/00* (2006.01)
(52) U.S. Cl. .................. 426/656; 426/650; 426/655
(58) Field of Classification Search .................. None
See application file for complete search history.

(56) References Cited

U.S. PATENT DOCUMENTS
6,344,231 B1    2/2002  Nakajo et al.

FOREIGN PATENT DOCUMENTS
| JP | 08-256685 A | 10/1996 |
|---|---|---|
| JP | 9-234058 A | 9/1997 |
| JP | 10-327802 A | 12/1998 |
| JP | 2001-178398 A | 7/2001 |
| JP | 2002-355008 A | 12/2002 |
| JP | 2005-102549 A | 4/2005 |
| JP | 2005-143465 A | 6/2005 |
| JP | 2005-143466 A | 6/2005 |
| JP | 2005-160402 A | 6/2005 |
| JP | 2006-67806 A | 3/2006 |
| WO | WO-99/16860 A1 | 4/1999 |

OTHER PUBLICATIONS

H. Takagi et al., "Isolation of Freeze-Tolerant Laboratory Strains of *Saccharomyces cerevisiae* from Proline-Analogue-Resistant Mutants". Appl. Microbial Biotechnol, (1997), vol. 47, pp. 405-411.
Supplemental European Search Report mailed Apr. 10, 2010, in European Application No. 06843501.5.
Liao et al., "The Production and Using of L-proline," Fajiao Keji Tongxun (Jun. 30, 2004), vol. 33, No. 2, pp. 13-14, with English translation.
Sheng, "Latest Trends of Yeast Extract Seasoning in Japan," Science and Technology of Food Industry (Oct. 15, 1990), vol. 5, pp. 15-19, with English translation.
Matsuki, T., Food Chemical Journal (Monthly), 1995, vol. 11, No. 6, pp. 45-48. Including partial English translation.
Ochi, et al., Natural Seasoning, Kohrin Techno Books Series 13, 1994, pp. 37-39. Including partial English translation.

*Primary Examiner* — Elizabeth Gwartney
(74) *Attorney, Agent, or Firm* — Birch, Stewart, Kolasch & Birch, LLP

(57) ABSTRACT

The present invention provides a seasoning serving as an alternative to hydrolyzed animal proteins.
The present invention provides a seasoning composition comprising free proline in an amount of 8.0% or more of the free amino acid composition, wherein the seasoning composition is not derived from collagen or gelatin; a seasoning composition comprising free proline in an amount of 6.0% or more of the free amino acid composition and free glycine in an amount of 5.0% or more of the free amino acid composition, wherein the seasoning composition is not derived from collagen or gelatin; a yeast extract comprising free proline in an amount of 8.0% or more of the free amino acid composition; and a seasoning composition comprising a yeast extract, wherein the seasoning composition comprises free proline in an amount of 6.0% or more of the free amino acid composition and free glycine in an amount of 5.0% or more of the free amino acid composition, etc. The present invention also provides a yeast strain for use in preparing such a seasoning composition and such a yeast extract.

3 Claims, No Drawings

SEASONING PRODUCTS WITH HIGH CONTENT OF SWEET AMINO ACIDS AND YEAST STRAIN FOR USE IN OBTAINING THE SAME

TECHNICAL FIELD

The present invention relates to a seasoning, particularly a yeast extract. The seasoning of the present invention is useful in the field of food industry.

BACKGROUND ART

Sweetness, a taste typical of sugar, is one of the five primary tastes, and saccharides such as sugar and glucose are primarily used as natural sweeteners. Also in the case of amino acids, proline, glycine and alanine are known to be sweet and may also be used for enhancement of sweetness, as circumstances demand, because the sweetness quality of these amino acids is different from that of saccharides.

Likewise, hydrolyzed animal proteins used frequently as seasonings in processed foods may also be used for enhancement of sweetness, because such hydrolysates mainly originate from collagen or gelatin, and hence have a characteristic sweetness rich in proline, glycine and alanine which are constituent amino acids of collagen or gelatin.

Yeast extracts are also used as seasonings in various foods (Patent Documents 1 to 3). For the application of yeast mutant strains in the field of food industry, some reports have been issued. For example, there is a report showing that mutant strains tolerant to AZC (a toxic analog of proline) have been screened to obtain a mutant strain which allows intracellular proline accumulation and is more tolerant to freezing stress than its parent strain (Non-patent Document 1). According to the same procedures or the like, a freeze-tolerant yeast strain which allows intracellular accumulation of one or more amino acids selected from proline, arginine, lysine and glutamic acid has been used in frozen bread dough (Patent Document 4). Likewise, a proline-accumulating yeast transformant has been used for brewing of Japanese rice wine (Patent Document 5). However, the former report focuses on the survival rate of yeast in frozen bread dough, while the latter report is directed to the ethanol tolerance of yeast and/or modification of Japanese rice wine to have a milder taste. Neither of them provides any information about the use of yeast as a seasoning. Moreover, neither of them aims to enhance a hydrolyzed animal protein-like sweetness or provides any information about the overall sweetness of proline, alanine and glycine.

Patent Document 1: JP 2005-102549 A
Patent Document 2: JP 10-327802 A
Patent Document 3: WO99/16860
Patent Document 4: JP 9-234058 A
Patent Document 5: JP 2006-67806 A
Non-patent Document 1: H. Takagi, F. Iwamoto, and S. Nakamori, Appln. Microbiol. Biotechnol., 47, 405-411, (1997).

DISCLOSURE OF THE INVENTION

Problems to be Solved by the Invention

Since hydrolyzed animal proteins are prepared through hydrochloric acid hydrolysis, it is known that substances suspected to be toxic, which are called monochloropropanediol (MCP) and dichloropropanol (DCP), are generated when the preparation is accomplished in a standard manner. Preparation techniques have been developed to give safe seasonings by reducing MCP and DCP, so that recent products have low MCP and DCP contents. However, there is still a great demand for alternative seasonings.

On the other hand, yeast extracts are derived from yeast cells and hence are rich in non-synthetic amino acids. Yeast cells are particularly rich in glutamic acid (a flavor component) and alanine (a sweet component) as free amino acids, and are expected as alternatives to hydrolyzed animal proteins. However, it has been difficult for yeast cells to provide a sweetness characteristic of hydrolyzed animal proteins, because their glycine and proline contents are particularly low.

Means for Solving the Problems

As a result of extensive and intensive efforts made to solve the problems stated above, the inventors of the present invention have found that yeast strains modified to increase their proline content are screened to find out those rich in glycine without any difference in their alanine content, thereby making it possible to obtain yeast cells and yeast extracts rich in these amino acids. This finding led to the completion of the present invention.

[Yeast Extract]

The present invention provides the following aspects.
1) A yeast extract comprising free proline in an amount of 8.0% or more of the free amino acid composition.
2) The yeast extract according to 1) above, which comprises free proline in an amount of 15.0% or more of the free amino acid composition.
3) A seasoning composition comprising a yeast extract, wherein the seasoning composition comprises free proline in an amount of 6.0% or more of the free amino acid composition and free glycine in an amount of 5.0% or more of the free amino acid composition.
4) A seasoning composition comprising a yeast extract, wherein the seasoning composition is supplemented with amino acids to have the amino acid composition shown in any one of 1) to 3) above.

The present invention also provides the following aspects.
1') A method for preparing a yeast extract comprising free proline in an amount of 8.0% or more of the free amino acid composition, which comprises the steps of: culturing cells of a strain belonging to the genus *Saccharomyces* or *Candida* and having a high proline-producing capacity and, if desired, having a high alanine-producing capacity under conditions effective for proline production (if desired, under conditions effective for proline production and also effective for glycine production) to obtain yeast cells; and obtaining the yeast extract from the resulting yeast cells.
2') The method according to 1' above, which is intended for preparation of a yeast extract comprising free proline in an amount of 15.0% or more of the free amino acid composition.
3') A method for preparing a seasoning composition comprising a yeast extract, wherein the seasoning composition comprises free proline in an amount of 6.0% or more of the free amino acid composition and free glycine in an amount of 5.0% or more of the free amino acid composition.
4') A method for preparing a seasoning composition comprising a yeast extract, wherein the seasoning composition is supplemented with amino acids to have the amino acid composition shown in any one of 1') to 3') above.

When reference is made herein to amino acids, such amino acids do not include amino acid residues constituting a part of a peptide or protein, and refer to amino acids in a free form, unless otherwise specified.

As used herein, the term "yeast extract" refers to an extract obtained from yeast cells by solvent extraction, unless otherwise specified. Purified, concentrated and dried forms of an extract also fall within the context of "yeast extract" as long as they are obtained through the extraction step and contain at least several types of amino acids.

When reference is made herein to content or composition values for components (e.g., amino acids) of a yeast extract or seasoning composition, these values are determined on a weight basis, unless otherwise specified.

The proline content in conventional yeast extracts is about 0.5% to 1% of the amino acid composition, whereas the proline content in the yeast extract of the present invention is 6.0% or more, preferably 8.0% or more, more preferably 9.0% or more, more preferably 13.0% or more, more preferably 14.0% or more, more preferably 15.0% or more, and even more preferably 17% or more. Likewise, the glycine content in conventional yeast extracts is about 1% to 2% of the amino acid composition, whereas the glycine content in the yeast extract of the present invention is 4.0% or more, preferably 5.0% or more, and more preferably 5.1% or more. Further, the alanine content in the yeast extract of the present invention is 12% to 17% of the amino acid composition, which is comparable to that of conventional yeast extracts.

In a preferred embodiment of the yeast extract of the present invention, the proline content is 6.0% of the amino acid composition and the glycine content is 4.0% of the amino acid composition. In addition, it is preferred that the alanine content is 12% to 17% of the amino acid composition.

In a more preferred embodiment, the proline content is 5.0% of the amino acid composition and the glycine content is 5.0% of the amino acid composition. In addition, it is preferred that the alanine content is 12% to 17% of the amino acid composition.

In an even more preferred embodiment, the proline content is 6.0% of the amino acid composition and the glycine content is 5.0% of the amino acid composition. In addition, it is preferred that the alanine content is 12% to 17% of the amino acid composition.

In another preferred embodiment, it is preferred not only that these amino acid contents are set at or above the defined values, but also that the content of bitter amino acids such as leucine, isoleucine and arginine is low, for example, ⅔ or less than that of conventional yeast extracts.

As described above, since the yeast extract of the present invention is rich in sweet amino acids, i.e., proline, glycine and alanine, it is of advance taste type, has a clear and well-harmonized taste, and prevents any heavy flavor from remaining in the mouth, when compared to conventional yeast extracts. The yeast extract of the present invention also presents a sweetness close to that of hydrolyzed animal proteins.

The yeast extract of the present invention can be prepared from yeast cells obtained as follows: strains having a high proline-producing capacity are screened to find out a strain whose alanine content is comparable to that of conventional yeast strains and which also has a high glycine-producing capacity.

Strains having a high proline-producing capacity can be obtained as follows: their parent strains are mutated by irradiation with ultraviolet or radioactive rays or by treatment with an agent such as ethylmethanesulfonate (EMS) or N-methyl-N'-nitro-N-nitrosoguanosine (NTG), and the resulting mutant strains are then screened to select strains that are tolerant to a proline analog, such as thioproline, azetidine-2-carboxylate (AZC) or dehydroproline. As to detailed procedures for obtaining mutant strains, reference may be made to, e.g., Non-patent Document 4 (supra) and also to the Example section described later.

As parent strains, various edible yeast strains may be used. Preferred for use are yeast strains belonging to the genus Saccharomyces (e.g., those belonging to *Saccharomyces cerevisiae, Saccharomyces rosei, Saccharomyces uvarum* and *Saccharomyces chevalieri*) or yeast strains belonging to the genus Candida (e.g., those belonging to *Candida utilis*).

For culturing these parent strains and mutant strains, it is possible to use a medium used frequently for yeast culturing, such as YPD medium or molasses medium. If desired, it is possible to use a carbon source such as glucose, sucrose, molasses or a saccharified solution and/or a nitrogen source such as ammonium sulfate, ammonium chloride, nitrate salt, urea or ammonia. The medium may be supplemented with minerals (e.g., phosphoric acid, potassium, magnesium, zinc, copper, manganese, iron), vitamins and/or amino acids.

Once strains having a high proline-producing capacity have been obtained, the strains thus obtained can be screened to select a strain having a high glycine-producing capacity and a high alanine-producing capacity, if desired. The determination of whether the resulting strain has high producing capacities can be accomplished by using prior art techniques (e.g., using an amino acid analyzer) to test the resulting yeast extract. It is also possible to select a strain having not only high producing capacities for the above amino acids, but also low producing capacities for bitter amino acids such as leucine, isoleucine and arginine.

A particularly preferred example of yeast which can be used for obtaining the yeast extract of the present invention is *Saccharomyces cerevisiae* JT-YE-P-52 (Accession No. ABP-10725) obtained herein in the Example section, which will be described later.

To prepare a yeast extract from yeast cells, the mutant strain obtained as above is first cultured under conditions effective for proline production (preferably, under conditions effective for proline production and also effective for glycine and/or alanine production). The culture temperature may be set to 20° C. to 38° C. As a medium, the above YPD medium, molasses medium or the like may be used. The medium pH may be adjusted to 3.5 to 8.0. The culture period may be set to 1 to 48 hours, for example, 8 to 36 hours. During culturing, it is possible to make shaking, agitation, aeration, or addition of the medium or additional ingredients, when required. An example of effective conditions is shaking or spinner culturing for 10 hours or longer using YPD medium (1.0% Bacto yeast extract, 2.0% Bacto peptone, 2.0% glucose).

Once the cultured product has been obtained, yeast cells are obtained from the cultured product through an appropriate means such as centrifugation, and then washed (when required), followed by boiling water extraction, enzymolysis and/or autolysis to give an extract.

Conditions for culturing and extraction may be determined as appropriate by those skilled in the art. As to detailed procedures for this purpose, reference may be made to the Example section described later.

[Seasoning Composition]

The inventors of the present invention have also found that a seasoning composition having the same amino acid composition as the above yeast extract is excellent, e.g., in terms of presenting a sweetness close to that of hydrolyzed animal proteins, as in the case of the above yeast extract. Thus, the present invention also provides the following aspects.

5) A seasoning composition comprising free proline in an amount of 8.0% or more of the free amino acid composition, wherein the seasoning composition is not derived from collagen or gelatin.

6) The seasoning composition according to 5) above, which comprises free proline in an amount of 15.0% or more of the free amino acid composition.

7) A seasoning composition comprising free proline in an amount of 6.0% or more of the free amino acid composition and free glycine in an amount of 5.0% or more of the free amino acid composition, wherein the seasoning composition is not derived from collagen or gelatin.

The present invention also provides the following aspects.

5') A method for preparing a seasoning composition without using collagen or gelatin, which comprises the step of incorporating free proline in an amount of 8.0% or more of the free amino acid composition.

6') The method for preparing a seasoning composition according to 5') above, which comprises the step of incorporating free proline in an amount of 15.0% or more of the free amino acid composition.

7') A method for preparing a seasoning composition without using collagen or gelatin, which comprises the step of incorporating free proline in an amount of 6.0% or more of the free amino acid composition and free glycine in an amount of 5.0% or more of the free amino acid composition.

To obtain the seasoning composition of the present invention, source materials other than the animal protein collagen or gelatin are used, including yeast extract, vegetable extract, bonito extract, dried bonito extract, kelp extract, pork meat extract, beef meat extract, chicken meat extract, raw fish sauce, soy sauce, miso (bean paste), etc.

The proline content in seasoning compositions derived from conventional yeast extracts is about 0.5% to 1% of the amino acid composition, whereas the proline content in the present invention is 6.0% or more, preferably 8.0% or more, more preferably 9.0% or more, more preferably 13.0% or more, more preferably 14.0% or more, more preferably 15.0% or more, and even more preferably 17% or more. Likewise, the glycine content in seasoning compositions derived from conventional yeast extracts is about 1% to 2% of the amino acid composition, whereas the glycine content in the present invention is 4.0% or more, preferably 5.0% or more, and more preferably 5.1% or more. Further, the alanine content in the present invention is 12% to 17% of the amino acid composition, which is comparable to that of conventional yeast extracts.

In a preferred embodiment of the seasoning composition of the present invention, the proline content is 6.0% of the amino acid composition and the glycine content is 4.0% of the amino acid composition. In addition, it is preferred that the alanine content is 12% to 17% of the amino acid composition.

In a more preferred embodiment, the proline content is 5.0% of the amino acid composition and the glycine content is 5.0% of the amino acid composition. In addition, it is preferred that the alanine content is 12% to 17% of the amino acid composition.

In an even more preferred embodiment, the proline content is 6.0% of the amino acid composition and the glycine content is 5.0% of the amino acid composition. In addition, it is preferred that the alanine content is 12% to 17% of the amino acid composition.

In another preferred embodiment, it is preferred not only that these amino acid contents are set at or above the defined values, but also that the content of bitter amino acids such as leucine, isoleucine and arginine is low, for example, 2/3 or less than that of conventional yeast extracts.

The seasoning composition of the present invention may be prepared by using the above strain which has a high proline-producing capacity and, if desired, also has a high alanine- and/or glycine-producing capacity, or alternatively, may be obtained by incorporating a conventionally prepared yeast extract with proline and, if desired, with glycine to give the defined amount(s).

[Novel Yeast]

The present invention also provides the following yeast strain for use in preparing the yeast extract of the present invention and the seasoning composition of the present invention.

8) A yeast strain belonging to the genus *Saccharomyces* or *Candida* and having a tolerance to azetidine-2-carboxylic acid (AZC), wherein upon culturing under conditions effective for proline production, a boiling water extract of the resulting cells may comprise free proline in an amount of 8.0% or more of the free amino acid composition.

9) The yeast strain according to 8) above, which is *Saccharomyces cerevisiae* JT-YE-P-52 (Accession No. ABP-10725) or a mutant strain thereof having the same microbiological properties.

The present invention also provides the following aspects.

8') A method for screening a yeast strain, which comprises the steps of: selecting strains tolerant to a proline analog from mutant strains derived from yeast strains belonging to the genus *Saccharomyces* or *Candida*; and selecting a strain having a high proline-producing capacity and, if desired, having a high glycine-producing capacity and/or a high alanine-producing capacity from the strains tolerant to a proline analog.

8") A method for creating a yeast strain, which comprises the steps of: selecting strains tolerant to a proline analog from mutant strains derived from yeast strains belonging to the genus *Saccharomyces* or *Candida*; and selecting a strain having a high proline-producing capacity and, if desired, having a high glycine-producing capacity and/or a high alanine-producing capacity from the strains tolerant to a proline analog.

As used herein, when a boiling water extract of the resulting cells may comprise a specific free amino acid (e.g., proline) in an amount of X% or more of the free amino acid composition, it is intended to explain the maximum capacity (proline-producing capacity) which can be achieved by a target yeast strain during its proline production, unless otherwise specified. More specifically, to determine whether a yeast strain meets this requirement, a boiling water extract obtained from this target yeast strain will be measured for its free amino acid composition. In this case, the target yeast strain provided for boiling water extraction has been cultured under conditions effective for producing a specific free amino acid (e.g., proline), as described herein. An example of effective conditions is shaking or spinner culturing for 10 hours or longer using YPD medium (1.0% Bacto yeast extract, 2.0% Bacto peptone, 2.0% glucose).

The yeast strain of the present invention may comprise free proline in an amount of 8.0% or more of the free amino acid composition, but it is preferably a yeast strain which may comprise free proline in an amount of 15.0% or more of the free amino acid composition. Another example of the yeast strain of the present invention is a yeast strain belonging to the genus *Saccharomyces* or *Candida* and having a tolerance to azetidine-2-carboxylic acid (AZC), wherein upon culturing under conditions effective for proline production and also effective for glycine and/or alanine production, a boiling water extract of the resulting cells may comprise free proline in an amount of 6.0% or more of the free amino acid composition and free glycine in an amount of 5.0% or more of the free amino acid composition.

Examples of a "strain having a high proline-producing capacity and, if desired, having a high glycine-producing capacity and/or a high alanine-producing capacity" as used herein include: a yeast strain wherein upon culturing under conditions effective for proline production, a boiling water extract of the resulting cells may comprise free proline in an amount of 8.0% or more of the free amino acid composition (preferably a yeast strain which may comprise free proline in an amount of 15.0% or more of the free amino acid composition); and a yeast strain wherein upon culturing under conditions effective for proline production and also effective for glycine and/or alanine production, a boiling water extract of the resulting cells may comprise free proline in an amount of 6.0% or more of the free amino acid composition and free glycine in an amount of 5.0% or more of the free amino acid composition.

The yeast strain of the present invention can be obtained by screening strains having a high proline-producing capacity, as described above. Microbiological properties of *Saccharomyces cerevisiae* JT-YE-P-52 (Accession No. ABP-10725) obtained herein in the Example section, which is an example of the yeast strain of the present invention, will be shown in the table below.

TABLE 1

Microbiological properties of JT-YE-P-52

| Morphology | Round to oval |
| --- | --- |
| Size | 3 to 7 μm |
| Sporulation | Presence |

| | Carbon source assimilation and fermentation | |
| --- | --- | --- |
| | Assimilation | Fermentation |
| D-Glucose | + | + |
| D-Galactose | + | + |
| Saccharose | + | + |
| Maltose | + | + |
| Lactose | − | − |
| Raffinose | + | + |
| Starch | − | − |

Morphology: Yeast cells were cultured in YPD medium and observed under a microscope.
Size: Yeast cells were cultured in YPD medium and observed under a microscope, as in the case of morphology.
Sporulation: Yeast cells grown on YPD agar medium were inoculated onto Sharman agar medium, cultured at 20° C. to 25° C. for 3 to 10 days, and observed under a microscope to confirm the presence or absence of sporulation.

Carbon source assimilation and fermentation: Assimilation was analyzed as follows. A loopful of fresh yeast cells grown on YPD agar medium was suspended in 5 ml sterilized water, washed twice with sterilized water by centrifugation and then suspended again in 5 ml sterilized water. The suspension thus obtained (0.1 ml) was inoculated into tubes (Sarstedt tubes, 101 mm×16.5 mm) containing 5 ml sterilized medium supplemented with various carbon sources, respectively (Yeast nitrogen base 0.67 g, various carbon sources 0.1 g each, water 10 ml), grown in shaking culture at 30° C. for 48 hours and then measured for absorbance at 660 nm to determine cell growth by the degree of turbidity. To analyze fermentation, a yeast cell suspension prepared as described above (0.1 ml) was inoculated into glass tubes (180 mm×15 mm) containing the same medium (10 ml) and equipped with a Durham's tube, grown in static culture at 30° C. for 1 week and then confirmed for the presence or absence of air bubbles in the Durham's tube.

[Other Embodiments and Applications, Etc.]

The yeast extract and seasoning composition of the present invention (hereinafter referred to as "the yeast extract and others of the present invention") may be in the form of liquid, paste, powder or granule, and may also be used in combination with other seasonings or additives acceptable as foods.

The yeast extract and others of the present invention can be incorporated into various foods (including health foods). In addition to foods, they can be incorporated into other products such as medicaments, cosmetics and pet foods.

The yeast extract and others of the present invention have the same sweetness quality as hydrolyzed animal proteins, and hence can be used as their alternatives in foods for which hydrolyzed animal proteins are suitable.

The yeast extract and others of the present invention can be used in meat, fish and vegetarian dishes. Specific examples of foods include white sauce, meat sauce, demiglace sauce, tomato sauce, curry, stew, cream soup, minestrone, sauces (e.g., Worcestershire sauce, middle-thick sauce, thick sauce, pork cutlet sauce, Okonomiyaki sauce (sauce for Japanese-style hotplate pizza), Yakisoba sauce (sauce for fried noodles), Takoyaki sauce (sauce for fried octopus dumplings)), seasoning soy sauces (e.g., those for Chinese noodles, buckwheat noodles and white wheat noodles), hot pot soup stock (e.g., Oden soup stock (stock for fish cake in soup)), miso soup, chop suey, Chinese-style donburi (stir-fried vegetables & seafood on rice), Chinese fried rice, Chinese fried dumplings, Chinese steamed dumplings, Chinese buns, junk foods, dressings, dried seasoning powder, dipping sauces (dipping sauce for grilled meat), Tsukudani (foods boiled in soy sauce), etc.

The yeast extract and others of the present invention can be used in frozen foods, ready-to-eat foods and instant foods.

The amount for use in foods may be determined as appropriate by those skilled in the art. For example, the yeast extract and others of the present invention may be added in an amount of 0.01% to 1% per weight of food when eaten or drunk.

ADVANTAGES OF THE INVENTION

The present invention enables the provision of a seasoning being free from MCP and DCP and being rich in sweet amino acids, and also enables the impartation of a sweetness characteristic of hydrolyzed animal proteins to foods.

Moreover, the present invention allows the predominance of sweetness due to the reduced content of amino acids generally known to be bitter, i.e., isoleucine, leucine and arginine.

The present invention will now be described in more detail by way of the following examples.

Example 1

A bakers' yeast strain JT-1 (Japan Tobacco Inc., Japan) was cultured in YPD medium (1.0% Bacto yeast extract (DIFCO), 2.0% Bacto peptone (DIFCO), 2.0% glucose) until reaching the logarithmic growth phase, and then suspended in a 0.067 M sodium phosphate solution, followed by UV irradiation for 2 minutes while stirring. The strain was then cultured at 32° C. for 5 days on a minimal medium (0.67% yeast nitrogen base w/o amino acid (DIFCO), 2.0% glucose, 2.0% agar) containing 10 mg/ml AZC (SIGMA) to obtain 147 AZC-tolerant strains. These colonies were each cultured in 50 ml YPD medium for an additional 24 hours and then centrifuged to collect the cells. The lyophilized cells were extracted with boiling water at 95° C. for 20 minutes and analyzed for their proline and glycine contents with an amino acid analyzer (Hitachi model L-8900). Among candidate strains, JT-YE-P-52 was obtained as a strain rich in proline and glycine.

Example 2

The strain JT-YE-P-52 was cultured with shaking for 24 hours using 10 baffled 500 ml Erlenmeyer flasks containing 200 ml YPD medium, and then centrifuged at 5000 rpm for 10 minutes to obtain wet cells (48.1 g). After addition of water (70 ml), the cells were extracted at 95° C. for 20 minutes while stirring. After extraction, centrifugation was performed at 5000 rpm for 10 minutes to separate extraction residues, thereby obtaining a yeast extract (yeast extract B, 76 g). This extract was measured for its free amino acid composition per solid content to obtain the results as shown in Table 1. For comparison purposes, the amino acid composition of a control extract (yeast extract A) prepared from the unmutated JT-1 strain is shown. Compared to the unmutated case, alanine remained unchanged, while glycine and proline increased. In addition, the percentages of bitter amino acids leucine, isoleucine and arginine were reduced to about half.

TABLE 2

Free amino acid composition of the extract of the present invention

|  | Yeast extract A | | Yeast extract B | |
| --- | --- | --- | --- | --- |
|  | Amino acid (%)/ solid content | Free amino acid composition | Amino acid (%)/ solid content | Free amino acid composition |
| Asp | 0.076 | 0.32 | 0.144 | 0.54 |
| Thr | 0.964 | 4.04 | 1.564 | 5.85 |
| Ser | 0.624 | 2.61 | 0.612 | 2.29 |
| Glu | 9.676 | 40.55 | 8.276 | 30.95 |
| Gly | 0.404 | 1.69 | 1.372 | 5.13 |
| Ala | 3.664 | 15.35 | 3.732 | 13.96 |
| (Cys)2 | 0.576 | 2.41 | 1.588 | 5.94 |
| Val | 1.024 | 4.29 | 0.868 | 3.25 |
| Met | 0.044 | 0.18 | 0.064 | 0.24 |
| Ile | 0.932 | 3.91 | 0.476 | 1.78 |
| Leu | 1.024 | 4.29 | 0.708 | 2.65 |
| Tyr | 0.272 | 1.14 | 0.352 | 1.32 |
| Phe | 0.312 | 1.31 | 0.392 | 1.47 |
| Lys | 1.1 | 4.61 | 0.156 | 0.58 |
| His | 0.188 | 0.79 | 0.28 | 1.05 |
| Arg | 2.776 | 11.63 | 1.556 | 5.82 |
| Pro | 0.208 | 0.87 | 4.596 | 17.19 |
| Total | 23.864 | 100.00 | 26.736 | 100 |
|  |  | Bitterness 19.83 |  | Bitterness 10.25 |

Example 3

To study taste effects for the extract of the present invention shown in Example 2, the following experiment was performed. First, 18 trained panelists were allowed to taste sugar, a hydrolyzed animal protein (Ekisutorahto; JT Foods Co., Ltd., Japan), yeast extract 21TF (JT Foods Co., Ltd., Japan), yeast extract 21A (JT Foods Co., Ltd., Japan) and the control extract from Example 1 (yeast extract A), whereby the panelists were given to understand that there was a difference in the quality of sweetness between sugar and the hydrolyzed animal protein, and were also made to recognize the sweetness quality of the hydrolyzed animal protein. Likewise, the panelists were also made to recognize that the control extract was free from the sweetness provided by the hydrolyzed animal protein.

The yeast extract A, which had been prepared from the strain JT-1 (the original parent strain used for mutation in the present invention) in the same manner as shown in Example 2, was added with proline (Wako Pure Chemical Industries, Ltd., Japan) at a final content of 5.0%, 7.0%, 8.0%, 9.0%, 13.0%, 14.0% or 15.0% of the amino acid composition, and then adjusted with hot water to 1% solid content. Separately, the yeast extract A was directly used to prepare a 1% solid content solution in hot water. To adjust the salt concentration at which the ability to detect sweetness is affected, these samples were added with salt in a final amount of 26% of the solid content, and then provided for a sensory evaluation. In the sensory evaluation, test samples were evaluated for sweetness intensity on a ten-point scale, assuming that a sample having the same sweetness intensity as the hydrolyzed animal protein "Ekisutorahto" scored 5 points. These samples were also evaluated for sweetness quality on a five-point scale, assuming that a sample having the same sweetness quality as the hydrolyzed animal protein scored 5 points, while a sample whose sweetness quality was greatly different from that of the hydrolyzed animal protein scored 1 point. Mean scores were obtained for each sample. This test was performed by the same 18 trained panelists as shown above.

The results obtained are as shown in Table 2. The samples containing 8% or more proline showed an increase in their sweetness and had a sweetness quality close to that of the hydrolyzed animal protein. A strong sweetness was observed in the sample containing 15% proline, and its sweetness quality was closer to that of the hydrolyzed animal protein. Moreover, the yeast extract B prepared in Example 2 showed a stronger sweetness and had a sweetness quality much closer to that of the hydrolyzed animal protein. This would be because the percentages of bitter amino acids were low, as shown in the table below.

TABLE 3

Result of a sensory evaluation of samples

| Test sample | Sweetness intensity | Sweetness quality | Comment |
| --- | --- | --- | --- |
| Yeast extract A (proline composition: 0.87%) | 1.2 | 1.2 |  |
| Amino acid-supplemented sample 1 (5% proline) | 2.1 | 1.4 |  |
| Amino acid-supplemented sample 2 (7% proline) | 2.1 | 1.6 |  |

TABLE 3-continued

Result of a sensory evaluation of samples

| Test sample | Sweetness intensity | Sweetness quality | Comment |
|---|---|---|---|
| Amino acid-supplemented sample 3 (8% proline) | 3.4 | 3.7 | This sample is of advance taste type, has a clear and well-harmonized taste, and prevents any heavy flavor from remaining in the mouth. Its sweetness quality is close to that characteristic of hydrolyzed animal proteins, rather than a heavy sweetness as observed in sugar. |
| Amino acid-supplemented sample 4 (9% proline) | 3.4 | 3.7 | |
| Amino acid-supplemented sample 5 (13% proline) | 3.6 | 3.7 | |
| Amino acid-supplemented sample 6 (14% proline) | 3.6 | 3.7 | |
| Amino acid-supplemented sample 7 (15% proline) | 4.4 | 4.5 | This sample is of advance taste type, has a clear and well-harmonized taste, and prevents any heavy flavor from remaining in the mouth. Its sweetness quality is very close to that characteristic of hydrolyzed animal proteins, rather than a heavy sweetness as observed in sugar. |
| Yeast extract B | 4.8 | 4.9 | This sample is of advance taste type, has a clear and well-harmonized taste, and prevents any heavy flavor from remaining in the mouth. Its sweetness quality is the same as that characteristic of hydrolyzed animal proteins, rather than a heavy sweetness as observed in sugar. |
| Hydrolyzed animal protein | 5 | 5 | |

Example 4

To study taste effects for the extract of the present invention shown in Example 2, the following experiment was performed.

As shown in Table 3, the yeast extract A was supplemented with proline at a final content of 6.0% and further with glycine at a final content of 3.0%, 4.0% or 5.0% to prepare test samples. The same procedure as shown in Example 3 was repeated to evaluate the sweetness intensity and quality of these samples in comparison with the yeast extract A, the yeast extract B or the hydrolyzed animal protein. The results indicated that the sample containing 5.0% glycine and 6.0% or more proline showed an increase in its sweetness. Likewise, the same test was also performed on the yeast extract A supplemented with glycine at a final content of 5.0% and further with proline at a final content of 3.0%, 4.0%, 5.0% or 6.0%, indicating that the sample containing 6.0% proline provided a sweetness quality close to that of the hydrolyzed animal protein. It should be noted that the organoleptic test was performed as described in Example 3.

TABLE 4

Result of a sensory evaluation of samples

| Test sample | Sweetness intensity | Sweetness quality | Comment |
|---|---|---|---|
| Yeast extract A (1.69% glycine, 0.87% proline) | 1.2 | 1.2 | |
| Amino acid-supplemented sample 1 (3.0% glycine, 6.0% proline) | 3 | 2.3 | |
| Amino acid-supplemented sample 2 (4.0% glycine, 6.0% proline) | 3.4 | 2.8 | This sample is of advance taste type, has a clear and well-harmonized taste, and prevents any heavy flavor from remaining in the mouth. Its sweetness quality is close to that characteristic of hydrolyzed animal proteins, rather than a heavy sweetness as observed in sugar. |

TABLE 4-continued

Result of a sensory evaluation of samples

| Test sample | Sweetness intensity | Sweetness quality | Comment |
|---|---|---|---|
| Amino acid-supplemented sample 3 (5.0% glycine, 6.0% proline) | 4.5 | 4 | |
| Amino acid-supplemented sample 4 (5.0% glycine, 3.0% proline) | 3.2 | 2.8 | |
| Amino acid-supplemented sample 5 (5.0% glycine, 4.0% proline) | 3.3 | 3.2 | |
| Amino acid-supplemented sample 6 (5.0% glycine, 5.0% proline) | 4 | 3.3 | This sample is of advance taste type, has a clear and well-harmonized taste, and prevents any heavy flavor from remaining in the mouth. Its sweetness quality is close to that characteristic of hydrolyzed animal proteins, rather than a heavy sweetness as observed in sugar. |
| Yeast extract B | 4.8 | 4.9 | This sample is of advance taste type, has a clear and well-harmonized taste, and prevents any heavy flavor from remaining in the mouth. Its sweetness quality is very close to that characteristic of hydrolyzed animal proteins, rather than a heavy sweetness as observed in sugar. |
| Hydrolyzed animal protein | 5 | 5 | |

Example 5

The extract of the present invention shown in Example 2, an extract prepared from the unmutated yeast cells, and a hydrolyzed animal protein were each lyophilized in a freeze-dryer and adjusted to give a salt concentration of 26% per solid content. According to the recipe shown in Table 4, white sauces were prepared using these samples and compared for their sweetness intensity and quality. The results indicated that the white sauce prepared using the extract of the present invention provided a sweetness comparable to that of the hydrolyzed animal protein.

TABLE 5

| Recipe of white sauce | |
|---|---|
| Milk | 37.5 |
| Onion | 12.5 |
| Bechamel | 5 |
| Carrot | 3.75 |
| Short-necked clam (shelled) | 3.75 |
| Salad oil | 0.5 |
| Processed starch | 0.5 |
| Salt | 0.4 |
| Consomme | 0.1 |
| Extract of the present invention | 0.1 |
| White pepper | 0.02 |
| Garlic pepper | 0.006 |
| Water | 35.88 |
| Total | 100.006 |

INDUSTRIAL APPLICABILITY

As described above, the present invention enables the production of a seasoning rich in sweet amino acids contained in hydrolyzed animal proteins without using hydrochloric acid hydrolysis techniques, and hence enables the provision of a MCP- and DCP-free seasoning to consumers.

The invention claimed is:

1. A yeast extract comprising:
   free proline in an amount of 15.0% or more of the free amino acid composition,
   free glycine in an amount of 5.0% or more of the free amino acid composition, and
   free alanine in an amount of 12 to 17% of the free amino acid composition.

2. A seasoning composition comprising a yeast extract, wherein the seasoning composition comprises free proline in an amount of 17.0% or more of the free amino acid composition, free glycine in an amount of 5.0% or more of the free amino acid composition, and free alanine in an amount of 12 to 17% of the free amino acid composition.

3. A method for adding hydrolyzed animal protein-like sweetness to a food, wherein the method comprises adding the yeast extract according to claim 1 or the seasoning composition according to claim 2 to the food.

* * * * *